** 3,056,670
Patented Oct. 2, 1962**

**3,056,670
METHOD FOR CONTROLLING AQUATIC FLORA**
George D. Stevens and Morris L. Neuville, Marinette, Wis., assignors to Ansul Chemical Company, Marinette, Wis., a corporation of Wisconsin
No Drawing. Filed Oct. 24, 1960, Ser. No. 64,247
4 Claims. (Cl. 71—2.7)

The present invention relates to novel toxicant compounds and method for controlling aquatic flora. More particularly, the present invention relates to chemical compounds unexpectedly more toxic to algae and simple plants than to warm-blooded animals and to methods of controlling the growth of aquatic flora by the use thereof.

Algae are the simplest plants. They are ubiquitous, being found in varying amounts in all natural fresh water. They are usually innocuous and go unnoticed. They are, however, seasonal increases in their concentration when they become so numerous that they form growths referred to as mats and blooms. They may actually fill ponds or streams to a degree that the aquatic life therein is adversely affected. Reservoirs in which such mats or blooms occur produce water which, though not usually organically harmful, has an aesthetically repulsive, fishy odor and taste which makes it unpalatable to individuals having tender sensibilities. The effect on odor and taste may occur even when the concentration of algae is relatively low. In the midwestern United States cattle have been poisoned by drinking water from ponds filled with water blooms. Some algae produce toxic organic substances which occasionally have been the cause of gastro-intestinal disorders in humans.

Extensive growths of algae in the form of mats and blooms create other problems in that they clog weirs and screens in drainage and irrigation facilities, impede the flow of water in trenches, canals, ditches and streams; in recreational areas they create unpleasant situations by their unsightly appearance, slimy feel and production of objectionable odors. Certain algae, furthermore, cause accelerated deterioration of submerged apparatus by attacking metal surfaces and breaking down concrete.

Other types of aquatic growth which require control are plants which are found in nearly all fresh water and have great economic significance. Their growth reduces the effective capacity of irrigation and other water distribution systems. The plants themselves consume significant amounts of water in transpiration and metabolism and generally interfere with the efficient and effective maintenance of water distributing systems. Under favorable climatic and environmental conditions the plants attain such a size as to interfere with navigation in small streams.

Algae and the plants concerned with in the present invention are of such biologically simple nature that they cannot simply be cut down and harvested or merely gathered up by any practical means. Any amount of them left behind reproduce with great ease and rapidity, creating the problem again in a short time.

The best solution to finding a means for elimination of aquatic flora is to treat the water in which they grow with a substance toxic to them. A chemical compound which interferes with the metabolism of the flora or its reproductive ability would provide such a solution.

Many such chemical treatments for the elimination of algae are known. Sodium arsenite is effective but undesirable because of its high toxicity to man and animals. Compounds less harmful to man and animals have been suggested but must be used in such high concentrations to be effective that maintenance of such concentrations in circulating water is practically impossible.

The present invention represents the satisfaction of a long felt need by workers in this field in that a new group of chemical compounds has been discovered which performs efficiently in eliminating aquatic flora even in relatively low concentrations and which is not harmful to man or animals unless concentrated several hundredfold beyond that concentration which is effective in eliminating aquatic flora. It has been discovered that methanearsonic salts of metals of the Group II–B of the periodic table of the elements possess the desirable characteristics set forth above. They are sparingly soluble and therefore may be used as solids which when contacted with water will dissolve slowly over lengthy periods, depending upon the size of the mass into which the compounds are formed. The greater the mass per surface area, the slower will be the dissolution. This limited solubility insures against their being dissipated from the area being treated and permits treatment of aquatic flora over extended periods with relative ease.

It is to be understood that the salts of methanearsonic acid may be used in accordance with the present invention in solution, suspension or in combination with an inert diluent, the particular form used being determined by the environment to be treated and the means available for supplying it to that environment.

Objects and advantages of the invention will be set forth in part hereinafter and in part will be obvious herefrom, or may be learned by practice with the invention, the same being realized and attained by means of the steps, compositions, combinations and improvements pointed out in the attended claims.

It is an object of the present invention to provide new compounds suitable for use as toxicants for aquatic flora. It is a further object to provide a new method of controlling the growth of aquatic flora. Another object is to provide compounds which are toxic to aquatic flora in low concentrations, but which are harmless to warm-blooded animals at the same concentrations.

As indicated above, it has been found that the objects of this invention may be realized by the utilization of methanearsonic salts of metals of the group II–B of the periodic table of the elements.

The copper and silver salts of the compounds used in the present invention were prepared in accordance with Examples I and II below and their effect on representative algal growths is given hereinafter in Examples III to VI. The toxicities of the salts of the present invention with respect to warmblooded animals are given in Example V.

EXAMPLE I

Copper methanearsonate, ($CH_3AsO_3Cu$, M.W. 201,48) was prepared by dissolving ten grams of purified disodium methanearsonate in 200 milliliters of water. To this was added, with vigorous stirring, 7 grams of copper chloride ($CuCl_2 \cdot 2H_2O$), which cause the pH to fall from 10.8 to 3.5. The very fine blue-white precipitate which formed was filtered off and dried at 100° C. Analysis indicated 32.1 percent copper (theory —32.6 percent) and 33.3 percent arsenic (theory —37.2 percent). In order to purify it, this material was repulped with boiling water and filtered and then repulped with boiling methanol and filtered and dried. Following this treatment the analysis was arsenic, 33.0 percent and copper 33.5 percent. The product melted at 299 to 307° C. with decomposition. Solubility in water at 25° C. was about 58 parts per million.

EXAMPLE II

The disilver salt of methanearsonic acid was prepared as follows:

To 75.3 grams of disodium methanearsonate hexahydrate dissolved in 150 milliliters of water were added 50 milliliters of an aqueous solution containing 85 grams of silver nitrate with vigorous stirring. The precipitate which formed made the solution so thick that an extra 150 milliliters of water were added before filtering. The precipitate was repulped twice with 450 milliliters of water and once with 450 milliliters of methanol and then dried.

The overall yield was 97 percent based on starting materials. Analysis indicated 62.6 percent silver (theory —61.0 percent) and 20.2 percent arsenic (theory —21.2 percent). The compound melted at 275° C. with decomposition. Solubility in water at 25° C. was about 35 p.p.m.

The activity of these compounds was demonstrated in three media and against four species of algae. The media were Allen's (Allen, M. B., Arch. Mikrobiol., 17, 34 (1952)), Gorham's, (Hughes, E. O., et al., Can. J. Microbiol., 4, 225 (1958)) and BOD dilution water (Standard Methods of Water, Sewage and Waste Analysis, American Public Health Association, 1955). These media have pH values of 7, 9 and 7 respectively and the order for supporting algal growth is from high to low, Allen's, Gorham's and dilution water. The four algal species are *Chlorella pyrenoidosa*, *Lyngbya versicolor*, *Phormidium retzii* and *Phormidium inundatum*.

EXAMPLE III

The algae were grown in the same medium in which they were tested, so there would be a minimum of shock to the algae in a transfer to the test flask. The concentration of the Chlorella was adjusted so that there were 300,000 cells per milliliter. In tests involving the other algae, 25 cc. of the test medium was inoculated with one drop of a homogenized young healthy culture. The desired quantity of algaecide was added and cultures were then incubated at 24°±1° C. under continuous cool fluorescent light, the intensity being 125 foot candles.

Copper methanearsonate and silver methanearsonate were each employed at several concentrations and the quantity necessary to control the algae growth for 23 to 28 days is shown in Tables 1–A and 1–B respectively.

A control was run using cultures of Chlorella; the untreated control samples showed excellent growth through the experiment.

Table I–A
COPPER METHANEARSONATE

[Concentration in p.p.m. to inhibit algae for 23 to 28 days]

|  | Medium | | |
|---|---|---|---|
|  | Allen's | Gorham's | BOD |
| *Chlorella pyrenoidosa* | 2.0 | 2.0 | 0.8 |
| *Lyngbya versicolor* | 0.4 | 0.8 |  |
| *Phormidium retzii* | 0.8 | 1.5 | 0.4 |
| *Phormidium inundatum* | 1.5 |  |  |

Table I–B
SILVER METHANEARSONATE

[Concentration in p.p.m. to inhibit algae for 23 to 28 days]

|  | Medium | | |
|---|---|---|---|
|  | Allen's | Gorham's | BOD |
| *Chlorella pyrenoidosa* | 0.1 | 0.14 | .05 |
| *Lyngbya versicolor* | 0.05 | 0.05 |  |
| *Phormidium retzii* | 0.014 | 0.03 | .02 |
| *Phormidium inundatum* | 0.014 |  |  |

The results reported in Tables I–A and I–B clearly show the effectiveness of the salts of methanearsonic acid as growth inhibitors for aquatic flora in extremely low concentrations. This is particularly significant in view of the fact that the algae in general are objectionable only when they multiply excessively.

EXAMPLE IV

These chemicals were also tested in Gorham's medium for 22 days against a species of Cladophora, filamentous green algae which was obtained in a rapidly growing stage from an experimental aquarium. Cladophora is a problem in reservoirs and lakes having rocky rather than sandy shores in which it often develops during the summer as extensive massive growths. When this material becomes detached by wave action and is thrown upon the shore, it usually requires immediate removal to prevent the development of septic odors. Neither Cladophora, nor the algae that contaminated the cultures (since the source was an aquarium) appeared to be resistant to these chemicals. The results appear in Table II.

Table II
EFFECT OF COPPER AND SILVER METHANEARSONATES ON CLADAPHORA ALGAE CONTAMINATED WITH GREEN ALGAE

|  | Effect of Treatment On— | |
|---|---|---|
|  | Cladophora | Contaminating Algae |
| Copper Methanearsonate, p.p.m.: |  |  |
| 0.2 | No effect | No effect. |
| 0.4 | No effect | No effect. |
| 0.8 | 100% toxic | 100% toxic. |
| 1.2 | 100% toxic | 100% toxic. |
| Silver Methanearsonate, p.p.m.: |  |  |
| 0.027 | No effect | No effect. |
| 0.052 | 100% toxic | 100% toxic. |
| 0.097 | 100% toxic | 100% toxic. |
| 0.140 | 100% toxic | 100% toxic. |

EXAMPLE V

In further tests, excised cuttings of 5 aquatic plants, namely: Pithophora sp. (branched filamentous algae), *Najas guadulapensis*, *Potamogeton diversifolius*, *Heteranthera dubia* (water stargrass) and *Anacharis canadensis* (elodea), were grown for a period of 5 weeks in the laboratory prior to treatment with chemicals. Following treatment at a concentration of 5 p.p.m. active ingredient, the plant cultures were maintained for 3 weeks before evaluation. Each test was run in triplicate.

The evaluation of herbicidal activity, or injury rating, is expressed by a number system ranging from 1 (no effect) to 10 (dead). At least 2 investigators rated each set of test jars. Individual jar evaluations as well as average injury ratings for each species and an overall injury rating (percent) for each concentration of chemical tested are shown in Table II.

In this test an injury rating of 75 percent at the 5 parts per million level is considered good.

Table III
COPPER METHYLARSONATE

[Concentration, 5 p.p.m.; water temperature, 74° F.]

| Plant | A | B | C | average, percent |
|---|---|---|---|---|
| Pithophora | 10 | 10 | 10 | 100 |
| Najas | 10 | 10 | 10 | 100 |
| Potamogeton | 10 | 10 | 10 | 100 |
| Water star-grass | 10 | 10 | 10 | 100 |
| Elodea | 10 | 10 | 10 | 100 |
| Overall average |  |  |  | 100 |

EXAMPLE VI

This silver salt was also tested further against the five additional aquatic plants as reported in Example V for the copper salt above. The results obtained are reported in Table IV.

*Table IV*

SILVER METHANEARSONATE

[Concentration, 5 p.p.m.; water temperature, 74° F.]

| Plant | A | B | C | Average, percent |
|---|---|---|---|---|
| Pithophora | 10 | 10 | 10 | 100 |
| Najas | 10 | 10 | 10 | 100 |
| Potamogeton | 10 | 10 | 10 | 100 |
| Water star-grass | 10 | 10 | 10 | 100 |
| Elodea | 10 | 10 | 10 | 100 |
| Overall average | | | | 100 |

Control samples of algae and plants grown under the same conditions but which were not treated with the toxicants of the present invention were healthy and still multiplying at the end of the three week evaluation period.

The results set forth above clearly indicate the effectiveness of the copper and silver salts of methanearsonic acid as toxicants for aquatic flora. Experiments were run using laboratory rats as test animals to determine the relative toxicity of other arsenic containing compounds previously suggested for use as toxicants for aquatic flora. The amount of toxicant in milligrams per weight of test animal in kilograms which when administered results in the death of 50% of the test animals is used as a measure of the compound's toxicity in warmblooded animals. Each compound was tested on rats.

In addition to their extremely high toxicity for aquatic flora, the copper and silver salts of methanearsonic acid are far less toxic to warmblooded animals than many of the commonly used compounds. Although a range of values can be obtained in such tests, depending upon the details of the test, the condition of the particular animals and so forth, the values given in Table V are believed to be representative.

*Table V*

Toxicity of Algaecides and Aquatic Herbicides to Warmblooded Animals

| Chemical | $LD_{50}$ in Rats, mg./kg. |
|---|---|
| $As_2O_3$ | 25 to 138. |
| Sodium Arsenite | 13. |
| Copper Methanearsonate | 1,700. |
| Disilver Methanearsonate | 1,200. |

It will be noted that the lethal dose of the compounds of the present invention for rats is several hundred times that present in a quart of water which is completely effective for controlling and killing aquatic flora. A man would have to imbibe several hundred gallons of water containing 5 p.p.m. of the present compounds to expose himself to the theoretical $LD_{50}$ dosage which indicates that these compounds are quite safe to use.

The invention in its broader aspects is not limited to the specific steps, means, compositions, combinations and improvements described, but departures may be made therefrom within the scope of the accompanying claims without departing from the principles of the invention and without sacrificing its chief advantages.

What is claimed is:

1. The process of controlling the growth of aquatic flora which comprises introducing into an aqueous environment containing such flora an amount toxic to the flora of a member selected from the group consisting of copper methanearsonate, silver methanearsonate, and mixtures of the foregoing.

2. The method of claim 1 wherein the silver methanearsonate is disilver methanearsonate.

3. The method of claim 1 wherein the copper methanearsonate corresponds to the formula $CH_3AsO_3Cu$.

4. A process as set forth in claim 1 wherein the concentration of said member in the aqueous environment is not more than 100 parts per million.

References Cited in the file of this patent

UNITED STATES PATENTS 2,221,339    Allison    Nov. 12, 1940
2,678,265    Schwerdle    May 11, 1954

OTHER REFERENCES

Early et al. in "Jr. of Econ. Entomology," vol. 49, 1956, pages 239–242.